US012320306B2

(12) United States Patent
Kobayashi et al.

(10) Patent No.: US 12,320,306 B2
(45) Date of Patent: Jun. 3, 2025

(54) ELECTRICITY GENERATION SYSTEM AND AIRCRAFT

(71) Applicant: JAPAN AEROSPACE EXPLORATION AGENCY, Tokyo (JP)

(72) Inventors: Hiroshi Kobayashi, Tokyo (JP); Ryuji Iijima, Tokyo (JP); Shunsuke Noguchi, Tokyo (JP); Akira Nishizawa, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 0 days.

(21) Appl. No.: 18/292,047

(22) PCT Filed: Jul. 19, 2022

(86) PCT No.: PCT/JP2022/028032
§ 371 (c)(1),
(2) Date: Jan. 25, 2024

(87) PCT Pub. No.: WO2023/013398
PCT Pub. Date: Feb. 9, 2023

(65) Prior Publication Data
US 2024/0337221 A1    Oct. 10, 2024

(30) Foreign Application Priority Data
Aug. 4, 2021 (JP) ................. 2021-127866

(51) Int. Cl.
*F02C 9/28* (2006.01)
*F02C 9/32* (2006.01)

(52) U.S. Cl.
CPC ................. *F02C 9/28* (2013.01); *F02C 9/32* (2013.01); *F05D 2220/323* (2013.01);
(Continued)

(58) Field of Classification Search
CPC .... F02C 3/04; F02C 7/32; F02C 7/268; F02C 9/28; F01D 15/10; F05D 2220/76; F05D 2270/052; F05D 2270/02; F05D 2270/021
See application file for complete search history.

(56) References Cited

U.S. PATENT DOCUMENTS 7,735,359 B2 *  6/2010  Umezawa .................. F02C 9/28
                                                73/114.15
8,344,673 B2 *  1/2013  Rotondo ................ F04D 29/668
                                                318/434
(Continued)

FOREIGN PATENT DOCUMENTS

JP      9-193675 A    7/1997
JP    2005-343458 A   12/2005
(Continued)

OTHER PUBLICATIONS

International Search Report dated Sep. 20, 2022 in International Application No. PCT/JP2022/028032.
(Continued)

*Primary Examiner* — Alain Chau
(74) *Attorney, Agent, or Firm* — SALIWANCHIK, LLOYD & EISENSCHENK

(57) ABSTRACT

An electricity generation system according to an embodiment of the present invention includes an engine, an electric generator, a detector, and a control device. The engine has a compressor including a rotating shaft. The electric generator is connected to the rotating shaft and generates electricity with rotational force of the rotating shaft. The detector detects shaft torque of the electric generator. The control device controls an operational status of the engine or the electric generator on the basis of the shaft torque.

12 Claims, 7 Drawing Sheets

(52) U.S. Cl.
CPC .... *F05D 2220/76* (2013.01); *F05D 2270/052* (2013.01); *F05D 2270/053* (2013.01)

(56) References Cited

U.S. PATENT DOCUMENTS

| | | | | |
|---|---|---|---|---|
| 9,729,096 | B2* | 8/2017 | Edwards | F02C 6/20 |
| 11,532,937 | B2* | 12/2022 | Brookes | F02C 7/26 |
| 11,646,579 | B2* | 5/2023 | Husband | H02J 1/102 |
| | | | | 290/4 C |
| 2010/0141193 | A1* | 6/2010 | Rotondo | F01D 15/10 |
| | | | | 318/432 |
| 2013/0098042 | A1* | 4/2013 | Frealle | F02C 3/10 |
| | | | | 60/734 |
| 2014/0350757 | A1 | 11/2014 | Wada et al. | |
| 2015/0098792 | A1* | 4/2015 | Doebbeling | F01D 21/003 |
| | | | | 415/1 |
| 2015/0100180 | A1 | 4/2015 | Oyori et al. | |
| 2015/0244296 | A1* | 8/2015 | Edwards | H02P 9/48 |
| | | | | 290/40 B |
| 2016/0010567 | A1* | 1/2016 | Cline | F23R 3/26 |
| | | | | 60/722 |
| 2018/0041152 | A1* | 2/2018 | Dennison | H02P 9/04 |
| 2021/0071583 | A1* | 3/2021 | Bruce | F01D 15/10 |
| 2021/0207543 | A1* | 7/2021 | Rougier | F01D 15/10 |
| 2021/0246837 | A1* | 8/2021 | Romero | F04D 19/026 |
| 2022/0251964 | A1* | 8/2022 | Drozd | F01D 21/14 |
| 2023/0103519 | A1* | 4/2023 | Jaljal | F02C 7/36 |
| | | | | 701/100 |
| 2024/0084893 | A1* | 3/2024 | Wakasa | H02P 9/006 |
| 2024/0239509 | A1* | 7/2024 | Fulleringer | B64D 35/02 |

FOREIGN PATENT DOCUMENTS

| | | |
|---|---|---|
| JP | 2011-230524 A | 11/2011 |
| JP | 5220242 B1 | 6/2013 |
| JP | 2013-231366 A | 11/2013 |

OTHER PUBLICATIONS

Office Action dated Dec. 24, 2024 in Japanese Application No. 2021-127866.

* cited by examiner

ELECTRICITY GENERATION SYSTEM AND AIRCRAFT

CROSS-REFERENCE TO RELATED APPLICATIONS

This application is the U.S. national stage application of International Patent Application No. PCT/JP2022/028032, filed Jul. 19, 2022, which claims the benefit under 35 U.S.C. § 119 of Japanese Application No. 2021-127866, filed Aug. 4, 2021, the disclosures of each of which are incorporated herein by reference in their entirety.

TECHNICAL FIELD

The present invention relates to an electricity generation system including an electric generator connected to a rotating shaft for an engine and an aircraft including the same.

BACKGROUND ART

An electricity generation system including an electric generator that generates electric power by rotation of a jet engine is known.

For example, Patent Literature 1 has disclosed an electricity generation system including: a first electric generator designed to generate electricity by rotation of a high-pressure shaft of a compressor constituting a jet engine; a second electric generator designed to generate electricity by rotation of a low-pressure shaft of the compressor; a first power regulation device for regulating power output of the first electric generator; a second power regulation device for regulating power output of the second electric generator; and a power control device which manipulates the first and second power regulation devices to ensure a specified amount or greater of jet engine surge margin.

CITATION LIST

Patent Literature

Patent Literature 1: Japanese Patent Application Laid-open No. 2013-231366

DISCLOSURE OF INVENTION

Technical Problem

In general, an electric device, which operates with electric power from an electric generator connected to a rotating shaft for an aircraft engine, is additionally provided with a protection device for cutting off the supply of electricity in a case where a fault has occurred. In a case where the protection device cuts off the supply of electricity, electric power required for the electric generator decreases and the shaft torque also decreases, such that electric generator RPM, i.e., engine RPM temporarily increases. In a case where the electric power of the electric device having a fault is small, a degree of increase in the RPM of the rotating shaft is also small, so it is ignorable for stably operating the engine.

However, in a case where the electric device supplies high electric power for a motor or the like for driving a propulsion unit such as fan and propellers, the electric power can increase up to several tens of percents of the engine shaft power, so the degree of increase in the RPM is not ignorable. At this time, the engine may have mechanical faults. Specific examples of the mechanical faults are surge in an engine compressor and excessive centrifugal force in a turbine. Since these faults may interfere with stable operation of not only the electric generator but also the engine and thus the safe flight, it is necessary to inhibit the occurrence of the faults in the electric device. Possible measures for inhibiting those events are to make a design with a relatively large surge margin, to continuously connect a resistor such as a load bank, to increase moment of inertia of a shaft system, and the like. However, there is a problem in that those measures lead to a weight increase or a decrease in system energy efficiency.

In view of the above-mentioned circumstances, it is an objective of the present invention to provide an electricity generation system capable of inhibiting the occurrence of a fault in an engine due to a sharp decrease in shaft torque of an electric generator without increasing the weight or decreasing the system energy efficiency and an aircraft including the same.

Solution to Problem

An electricity generation system according to an embodiment of the present invention includes an engine, an electric generator, a detector, and a control device.

The engine has a compressor including a rotating shaft.

The electric generator is connected to the rotating shaft and generates electricity with rotational force of the rotating shaft.

The detector detects shaft torque of the electric generator.

The control unit controls an operational status of the engine or the electric generator on the basis of the shaft torque.

Since the electricity generation system controls the operational status of the engine or the electric generator on the basis of the shaft torque of the electric generator, suitable operational status control according to a change in the shaft torque of the electric generator can be achieved as compared to a case of controlling the operational status on the basis of RPM of the rotating shaft in the compressor.

The control unit may be configured to control the operational status in a case where the control unit determines that a change in the shaft torque is equal to or larger than a predetermined value.

Accordingly, the occurrence of a fault in the engine due to a sharp decrease in the shaft torque of the electric generator can be inhibited.

In this case, the control unit may be configured to control power of the engine in a case where the control unit determines that a change in the shaft torque is equal to or larger than a predetermined value.

For example, the engine may further include a combustor that combusts an air-fuel mixture compressed by the compressor and a turbine that is connected to the rotating shaft and rotates combustion gas discharged from the combustor, and the control unit may make a control to reduce an amount of fuel injected into the combustor in a case where the control unit determines that a decrease in the shaft torque is equal to or larger than a predetermined value.

On the other hand, the control unit may be configured to control power of the electric generator in a case where the control unit determines that a change in the shaft torque is equal to or larger than a predetermined value.

Accordingly, the occurrence of a fault in the engine due to a sharp decrease in the shaft torque of the electric generator can be inhibited.

In this case, the control unit may be configured to control the electric generator to generate braking torque in a case where the control unit determines that a decrease in the shaft torque is equal to or larger than a predetermined value.

The braking torque may be electromagnetic braking torque.

For example, the electricity generation system may further include a short-circuit that short-circuits between terminals of a polyphase electromagnetic coil in the electric generator, and the control unit may be configured to control the short-circuit to short-circuit between terminals of the electromagnetic coil in respective phases in a case where the control unit determines that a decrease in the shaft torque is equal to or larger than a predetermined value.

Alternatively, the electricity generation system may further include a power supply source connected to the electric generator, in which the control unit may be configured to make a control to supply electric power from the power supply source to the electric generator in a case where the control unit determines that a decrease in the shaft torque is equal to or larger than a predetermined value.

The detector may include an ammeter that detects current of electric power generated by the electric generator.

Advantageous Effects of Invention

In accordance with the present invention, the occurrence of a fault in an engine due to a sharp decrease in shaft torque of an electric generator can be inhibited.

MODE(S) FOR CARRYING OUT THE INVENTION

Hereinafter, embodiments of the present invention will be described with reference to the drawings.

First Embodiment

Figure 1:
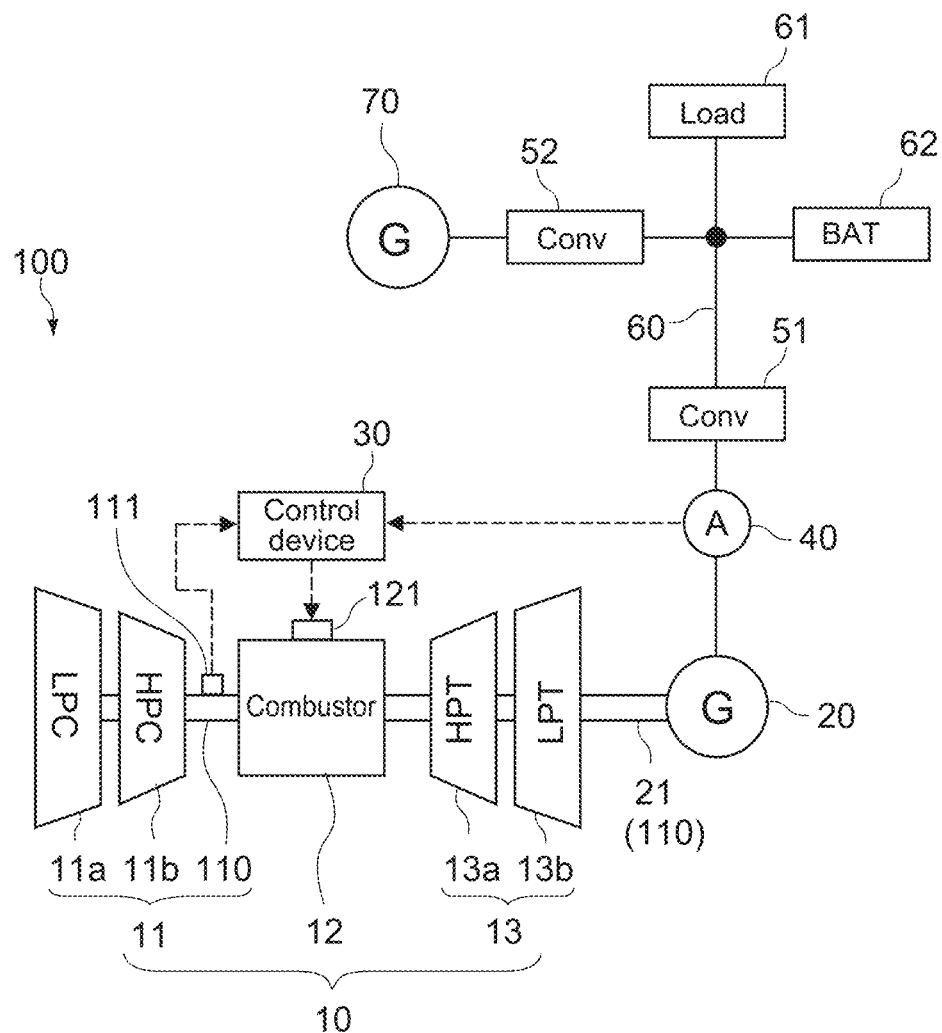
FIG. 1 A schematic configuration diagram of an electricity generation system according to a first embodiment of the present invention.

FIG. 1 is a schematic configuration diagram of an electricity generation system 100 according to a first embodiment of the present invention. The electricity generation system 100 according to the present embodiment is an engine with an electric generator mounted on an aircraft and includes an engine 10, an electric generator 20, and a control device 30.

Examples of the aircraft on which the electricity generation system 100 is mounted include a motorized aircraft that drives a propulsion system, such as fan and propellers, with electric power from the electric generator 20 in addition to an aircraft including the engine 10 as a propulsion device.

The engine 10 is a jet engine and includes a compressor 11, a combustor 12, and a turbine 13.

The compressor 11 includes a rotating shaft 110 as an engine shaft and a low-pressure compressor 11a and a high-pressure compressor 11b. The low-pressure compressor 11a and the high-pressure compressor 11b are connected to the rotating shaft 110. The compressor 11 injects the air, which is obtained by adiabatically compressing the low-pressure compressor (LPC) 11a and the high-pressure compressor (HPC) 11b, into the combustor 12 at the subsequent stage.

Each of the low-pressure compressor 11a and the high-pressure compressor 11b includes a plurality of rotor blades and a plurality of stator blades. The plurality of rotor blades rotates together with the rotating shaft 110 and compresses the air between the plurality of rotor and the plurality of stator blades. Moreover, although not shown in the figure, a fan that allows the air to flow into the low-pressure compressor 11a may be provided at the previous stage of the compressor 11. The fan is connected to the rotating shaft 110 and rotates integrally with the compressor 11.

The combustor 12 includes a mixing chamber and a combustion chamber. The mixing chamber is for mixing the air compressed by the compressor 11 with the fuel injected from a fuel injector 121. The combustion chamber is for combusting the mixture. The combustor 12 discharges the high-pressure combustion gas to the turbine 13 at the subsequent stage. The control device 30 controls the flow rate of the fuel injected into the combustor 12 from the fuel injector 121. Typically, the flow rate of the fuel is adjusted on the basis of RPM of the rotating shaft 110 detected by an RPM sensor 111.

The turbine 13 includes a high-pressure turbine (HPT) 13a and a low-pressure turbine (LPT) 13b. The high-pressure turbine (HPT) 13a and the low-pressure turbine (LPT) 13b are connected to the rotating shaft 110. The turbine 13 rotates by receiving the combustion gas discharged from the combustor 12. The rotation of the high-pressure turbine 13a and the low-pressure turbine 13b is transmitted to the compressor 11 via the rotating shaft 110 and used as driving force for continuously suctioning and compressing the air.

The electric generator 20 includes a drive shaft 21 directly coupled to the rotating shaft 110. The drive shaft 21 may form a part of the rotating shaft 110. The electric generator 20 typically includes a rotor and a stator. The rotor has a permanent magnet attached to the drive shaft 21. A polyphase electromagnetic coil is wound around the stator. The electric generator 20 is an AC generator that converts rotational force of the rotating shaft 110 into electric energy. As for the polyphase electromagnetic coil, it is not particularly limited as long as two or more ACs in different phases can flow through the electromagnetic coil. Here, electromagnetic coils in three phases, U-, V-, and W-phases, are used. The electric generator 20 is not limited to an example in which it is connected to the subsequent stage (turbine 13 side) of the engine 10. The electric generator 20 may be connected to the previous stage (compressor 11 side) of the engine 10.

Electric power generated using the rotational force of the engine 10 is supplied to a power line 60 connected to a load 61, a battery 62, and the like via an AC-to-DC converter 51. The converter 51 is an electric power converter that converts electric power generated by the electric generator 20 into predetermined electric power and supplies it to the power line 60.

The load 61 is, for example, a variety of electronic devices such as a hydraulic pump for driving a variety of hydraulic devices in the aircraft and an air conditioner. In a case of a motorized aircraft, the load 61 includes a motor for driving a propulsion unit such as propellers. The battery 62 is a secondary battery, which is rechargeable and used as an auxiliary power supply. The battery 62 has a battery main body, a charge and discharge circuit that controls the charge and discharge of the battery, and the like.

The power line 60 may be additionally provided with a protection device such as a circuit breaker for cutting off the supply of electricity to the load 61 in a case where a fault such as a short-circuit or ground fault has occurred in the load 61.

An auxiliary electric generator 70 driven by another power source other than the engine 10 may be additionally connected to the power line 60. The other power source is, for example, a propulsion unit such as propellers. In this case, the auxiliary electric generator 70 generates regenerative electric power by rotation of the propellers. Electric power generated by the auxiliary electric generator 70 is supplied to the power line 60 via an electric power converter such as a converter 52.

On the other hand, the electricity generation system 100 further includes an ammeter 40. The ammeter 40 is connected between the electric generator 20 and the converter 51. The ammeter 40 detects the magnitude of current of electric power generated by the electric generator 20 (hereinafter, also referred to as electric generator current) and outputs the detection signal to the control device 30.

The electric generator current is proportional to shaft torque of the electric generator 20 (twisting moment acting on the drive shaft 21). That is, as the shaft torque of the electric generator 20 increases, the electric generator current also increases. Therefore, the ammeter 40 functions as a detector that detects the shaft torque of the electric generator 20. It should be noted that a strain gauge or the like that measures the twist of the drive shaft 21 of the electric generator 20 may be employed as the detector in place of the ammeter 40.

The control device 30 is constituted by a computer (information processing apparatus) including a central processing unit (CPU) and a memory. As described above, the control device 30 typically adjusts the flow rate of the fuel injected into the combustor 12 from the fuel injector 121 on the basis of the output of the RPM sensor 111. The control device 30 adjusts the flow rate of the fuel so that the engine 10 can rotate the rotating shaft 110 at RPM that can provide a predetermined surge margin. A control cycle for the fuel flow rate based on the output of the RPM sensor 111 is, for example, several tens of milliseconds.

Figure 2:
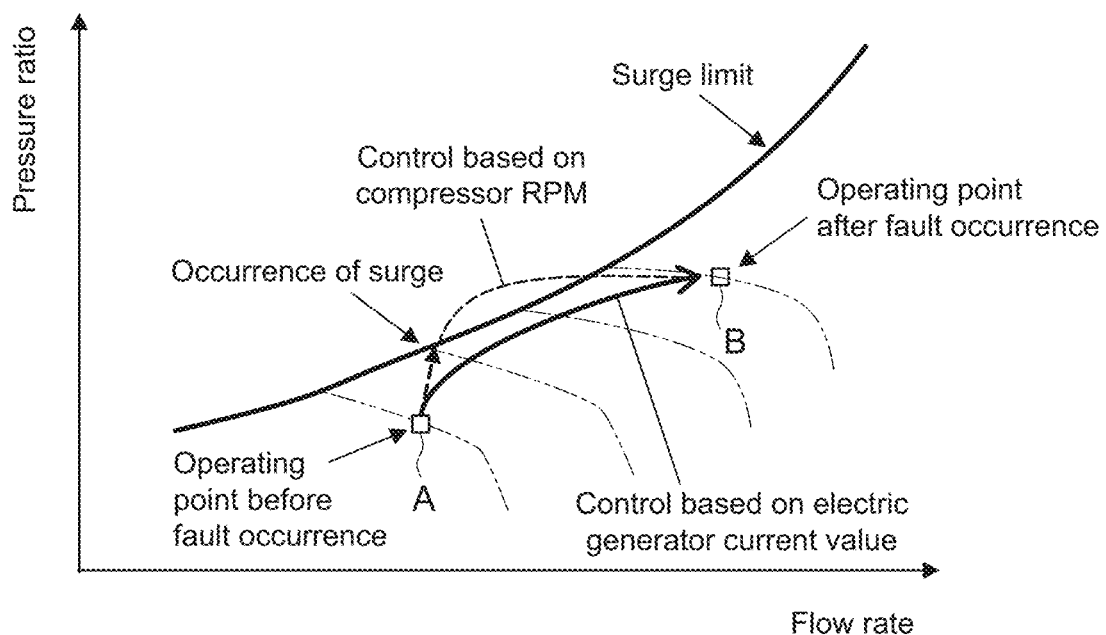
FIG. 2 A schematic diagram showing a relationship between flow rate and pressure ratio at a compressor in the electricity generation system.

For example, the operational status of the compressor 11 is represented on a performance map as schematically shown in FIG. 2. FIG. 2 is a schematic diagram showing a relationship between flow rate and pressure ratio (ratio of inlet total pressure to outlet total pressure) in the compressor 11. When the RPM of the rotating shaft 110 sharply increases from an operating point shown in A in the figure, the pressure ratio increases but the flow rate does not sharply increase. Therefore, in a case where the degree of increase in the RPM is large, the pressure ratio exceeds the surge limit as shown with the broken-line arrow in a process in which the operating point A shifts to a target operating point shown in B in the figure (operating point for sharply increased RPM), and it adversely affects the safe operation of the compressor 11 and thus the engine 10. Therefore, it is necessary to reduce the RPM so as not to exceed an upper limit ($N_{limit}$) of the RPM at a certain flow rate.

On the other hand, the electric generator 20 obtains electric power required by the electric device (load 61) at the subsequent stage from shaft power, and the converter 51 controls the current to provide desired electric power while maintaining the DC bus voltage at the subsequent stage. Here, in the electric generator 20 sharing the rotating shaft 110 with the engine 10, required electric power suddenly decreases because of a fault in the electric device at the subsequent stage or operation of a circuit breaker that cuts off the supply of electricity or the like, the shaft torque of the electric generator 20, i.e., the electric generator current sharply decreases. Accordingly, the RPM of the compressor 11 sharply increases.

Figure 3:
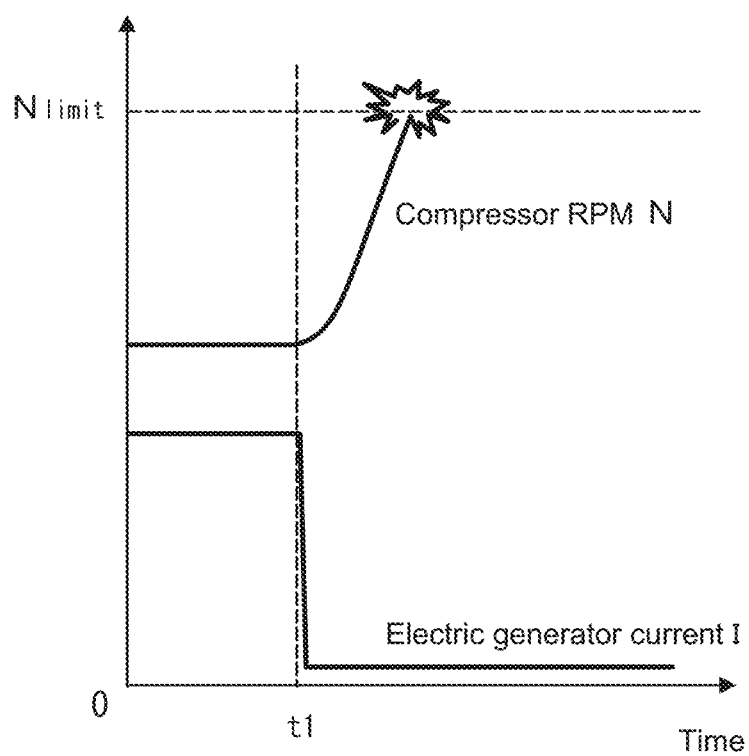
FIG. 3 A diagram showing a relationship between compressor RPM and electric generator current in a case where the pressure ratio at the compressor exceeds a surge limit.

As an example, FIG. 3 shows a relationship between compressor RPM (N) and electric generator current (I) in a case where the pressure ratio at the compressor 11 exceeds the surge limit. A time t1 in the figure corresponds to an operation time of the above-mentioned circuit breaker. In the method of reducing the shaft RPM in a desired range by detecting a sharp increase in the RPM by the RPM sensor 111 and reducing the fuel flow rate, a sharp decrease in the electric generator current can occur in a time of a millisecond or less. Therefore, the fuel control cannot be performed in time, and the RPM of the compressor 11 can exceed the upper limit value ($N_{limit}$).

In view of this, the electricity generation system 100 according to the present embodiment is configured to be capable of determining a sharp decrease in the shaft torque of the electric generator 20 on the basis of the electric generator current detected by the ammeter 40 and restricting the flow rate of the fuel before the RPM of the compressor 11 sharply increases.

Figure 4:
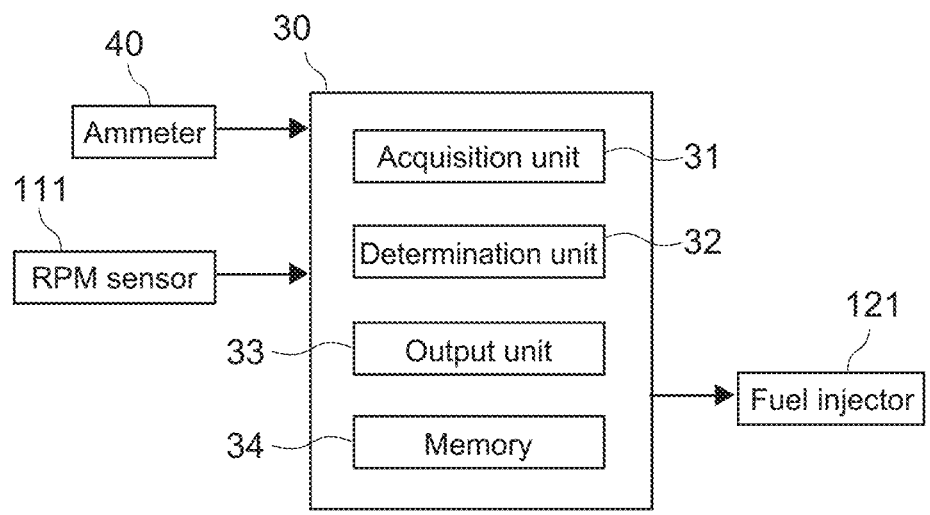
FIG. 4 A block diagram showing a configuration of a control device in the electricity generation system.

FIG. 4 is a block diagram showing a configuration of the control device 30. The control device 30 includes an acquisition unit 31, a determination unit 32, an output unit 33, and a memory 34.

The acquisition unit 31 acquires from the ammeter 40 a detected value of the electric generator current at a predetermined cycle. The predetermined cycle is, for example, 1 millisecond.

The determination unit 32 determines whether or not a decrease in the shaft torque of the electric generator 20 is equal to or larger than a predetermined value on the basis of the acquired value of the electric generator current or its change over time. As a determination method, it is determined that a decrease in the shaft torque of the electric generator 20 is equal to or larger than a predetermined value for example when an electric generator current value drops below a predetermined threshold ($I_{th}$), when the electric generator current value drops below a certain percent with respect to the current value so far, or when a time rate of change (dI/dt) of an amount of decrease in the electric generator current value exceeds a predetermined value. The threshold ($I_{th}$) is not particularly limited as long as the value enables detection of a decrease in electric generator current that appears when the circuit breaker operates in a case where a fault has occurred in the load 61.

In a case where it is determined that a decrease in the shaft torque of the electric generator 20 is equal to or larger than a predetermined value, the output unit 33 generates a control signal for controlling the operational status of the engine 10. In the present embodiment, in a case where it is determined that a decrease in the shaft torque of the electric generator 20 is equal to or larger than a predetermined value, the output unit 33 is configured to output a control signal for controlling the power of the engine 10 to the fuel injector 121 by reducing the flow rate of the fuel injected into the combustor 12. The control to reduce the fuel flow rate is, for example, a method of setting the fuel flow rate to be a flow rate that allows the engine 10 to operate at RPM corresponding to idling (hereinafter, also referred to as an idling flow rate), though not limited thereto. A method of stepwisely restricting the fuel flow rate may be employed.

The memory 34 is constituted by a storage element such as a semiconductor memory. The memory 34 stores various parameters necessary for computing in addition to a program (software) for executing the acquisition unit 31, the determination unit 32, and the output unit 33 as functional blocks of the control device 30.

Figure 5:
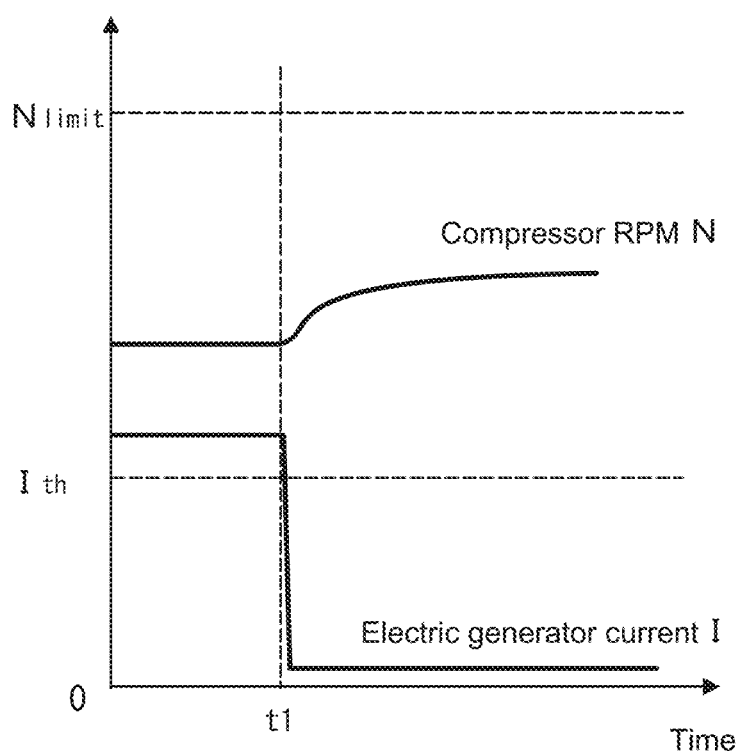
FIG. 5 A diagram showing an example of changes over time in compressor RPM and electric generator current for describing an action of the electricity generation system.
Figure 6:
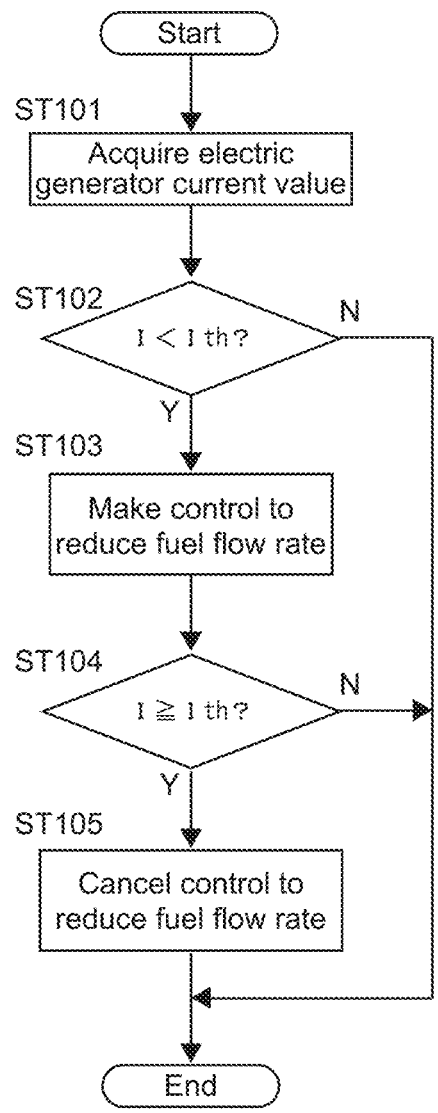
FIG. 6 A flowchart showing an example of a processing procedure performed by the control device.

FIG. 5 is a diagram showing an example of changes over time in compressor RPM (N) and electric generator current (I) for describing an action of the electricity generation system 100 according to the present embodiment. FIG. 6 is a flowchart showing an example of a processing procedure performed by the control device 30.

As shown in FIG. 6, the acquisition unit 31 acquires a current value of electric generator current from the ammeter 40 (Step 101). The determination unit 32 determines whether or not the current value (I) of the electric generator current acquired by the acquisition unit 31 is smaller than the predetermined threshold ($I_{th}$) (Step 102). In a case where the current value (I) is equal to or larger than the threshold ($I_{th}$) (in Step 102, "N"), the output unit 33 maintains normal control on the fuel flow rate on the basis of the output of the RPM sensor 111.

On the other hand, when the circuit breaker that cuts off the supply of electricity because of a fault that has occurred in the electric device (load 61) at the subsequent stage of the electric generator 20 at the time t1 in FIG. 5 operates, the shaft torque of the electric generator 20, i.e., the electric generator current sharply decreases below the threshold ($I_{th}$). In response to this sharp decrease in the electric generator current, the determination unit 32 determines that the current value (I) of the electric generator current is smaller than the predetermined threshold ($I_{th}$) (in Step 102, "Y"), and the output unit 33 outputs a control signal for reducing the fuel flow rate to be the idling flow rate to the fuel injector 121 (Step 103).

It should be noted that the threshold ($I_{th}$) of the electric generator current is not limited to a fixed value. For example, using normal electric generator current (e.g., average value until several seconds or several tens of seconds before the current time) as a reference current value ($I_{ref}$), it may be determined that the current value (I) of the electric generator current is smaller than the threshold ($I_{th}$) when a first relative ratio ($I/I_{ref}$) that is a ratio of the current value (I) of the electric generator current to the reference current value ($I_{ref}$) drops below a second relative ratio ($I_{th}/I_{ref}$) that is a ratio of the threshold ($I_{th}$) of the electric generator current to the reference current value ($I_{ref}$). The value of the second relative ratio ($I_{th}/I_{ref}$) is not particularly limited. For example, it is 0.5 (50%).

The above-mentioned control to reduce the fuel flow rate adjusts the power of the engine 10 so that the RPM of the compressor 11 becomes the idling RPM. Accordingly, as shown in FIG. 5, the degree of increase in compressor RPM (N) due to a sharp decrease in the electric generator current (I) can be kept small and the compressor RPM (N) can be inhibited from exceeding the upper limit value ($N_{limit}$). As a result, as shown with the solid-line arrow in FIG. 2, the compressor 11 can shift the operational status of the engine 10 from an operating point A before the occurrence of a fault to an operating point B after the occurrence of a fault without exceeding the surge limit.

The above-mentioned processing is continuously performed until the current value (I) of the electric generator current becomes equal to or larger than the threshold ($I_{th}$) (in Step 104, "N"). On the other hand, in a case where the sharp decrease in the electric generator current due to the fault is overcome (in Step 104, "Y"), the control device 30 cancels the control to reduce the fuel flow rate and performs typical flow rate control again (Step 105).

As described above, in accordance with the present embodiment, even in a case where the electric power of the electric generator sharply decreases because of a fault or the like in the electric device forming at least a part of the load 61, the compressor 11 can safely maintain the operation without any surge, and can maintain the safe operation of the engine 10 and thus the safe flight of the aircraft.

In particular, in accordance with the present embodiment, the control to reduce the fuel flow rate is made on the basis of the output of the ammeter 40 that detects the electric generator current. Therefore, as compared to a case of adjusting the fuel flow rate on the basis of the output of the RPM sensor 111, a sharp decrease in the shaft torque of the electric generator based on a sharp decrease in the electric generator current can be detected before the RPM sharply increases. Moreover, the control cycle based on the electric generator current is in units of milliseconds. Therefore, the control to reduce the fuel flow rate can be made before the RPM sharply increases.

Second Embodiment

Figure 7:
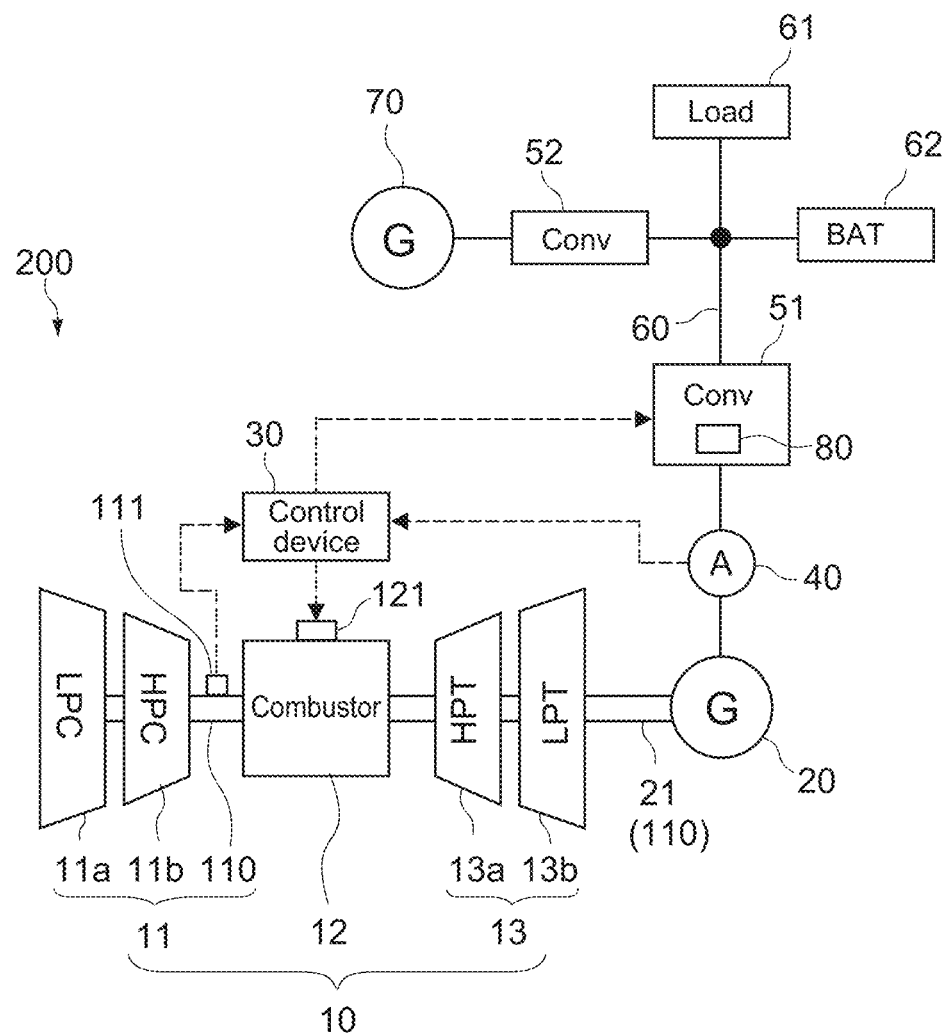
FIG. 7 A schematic configuration diagram of an electricity generation system according to a second embodiment of the present invention.

FIG. 7 is a schematic configuration diagram of an electricity generation system 200 according to a second embodiment of the present invention. Hereinafter, configurations different from those of the first embodiment will be mainly described, and configurations similar to those of the first embodiment will be denoted by similar reference signs and descriptions thereof will be omitted or simplified.

The electricity generation system 200 according to the present embodiment is an engine with an electric generator mounted on an aircraft and includes an engine 10, an electric generator 20, a control device 30, and an ammeter 40 as in the first embodiment, but it further includes a short-circuit 80 in the present embodiment, which is a difference from the first embodiment.

Figure 8:
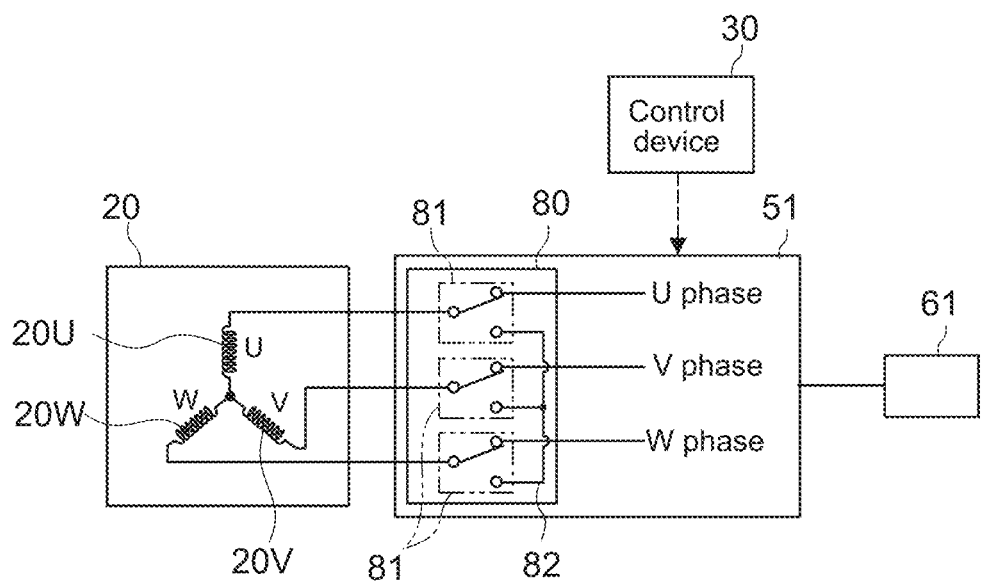
FIG. 8 A configuration of a circuit diagram showing a short-circuit of an electric generator in the electricity generation system.

FIG. 8 is a circuit diagram showing a configuration of the short-circuit 80. In the present embodiment, the short-circuit 80 is incorporated in the converter 51. The present invention is not limited thereto, and the short-circuit 80 may be incorporated in the electric generator 20 or may be constituted by a circuit independent of the converter 51, the electric generator 20, and the like.

The short-circuit 80 includes switching elements 81 respectively connected to electromagnetic coils 20U (U-phase), 20V (V-phase), and 20W (W-phase) in respective phases in the electric generator 20. The switching elements 81 are configured to be capable of switching the electromagnetic coils 20U to 20W in the respective phases to a short-circuit line 82 by receiving control signals (switching signals) from the control device 30. The short-circuit line 82 connects terminals of the electromagnetic coils 20U to 20W in the respective phases to each other via the switching elements 81 and short-circuits between them. The switching elements 81 are typically constituted by metal oxide semiconductor field effect transistors (MOSFETs).

Figure 9:
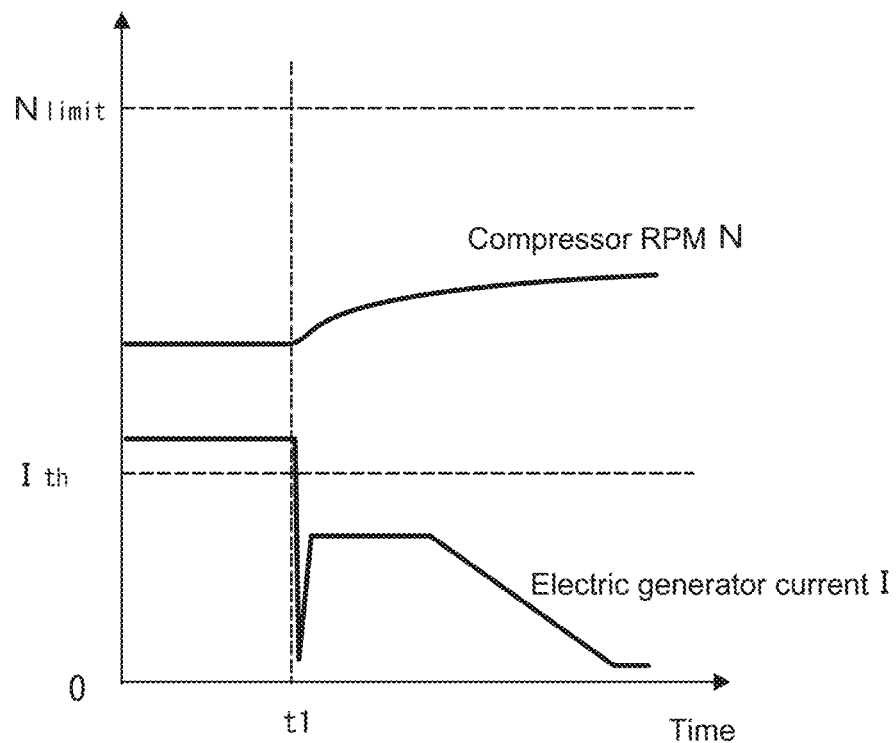
FIG. 9 A diagram showing an example of changes over time in compressor RPM and electric generator current for describing an action of the electricity generation system.

FIG. 9 is a diagram showing an example of changes over time in compressor RPM (N) and electric generator current (I) for describing an action of the electricity generation system 200 according to the present embodiment. In a case of determining that the current value (I) of the electric generator current sharply decreases below the predetermined threshold ($I_{th}$) at the time t1 on the basis of the output of the ammeter 40, the control device 30 outputs a control signal for connecting the electromagnetic coils 20U to 20W in each phase to the short-circuit line 82 to each switching element 81 of the short-circuit 80. Accordingly, short-circuiting occurs between the terminals of the electromagnetic coils 20U to 20W in the respective phases in the electric generator 20.

When short-circuiting occurs between the electromagnetic coils 20U to 20W in the respective phases, electromagnetic interaction between the electromagnetic coils 20U to 20W and the rotor (permanent magnet) of the electric generator 20 causes induced electromotive force in the respective electromagnetic coils 20U to 20W. That is, when induced current flows through the respective electromagnetic coils 20U to 20W, a predetermined electromagnetic force acts on the rotor, which inhibits the rotor movement, and braking torque (electromagnetic braking torque) is generated in the electric generator 20.

Therefore, also in the present embodiment, as in the first embodiment, even in a case where the shaft torque of the electric generator changes to be equal to or larger than a predetermined value and the electric power of the electric generator sharply decreases because of a fault or the like in the electric device forming at least a part of the load 61, the compressor 11 can safely maintain the operation without any surge, and can maintain the safe operation of the engine 10 and thus the safe flight of the aircraft.

It should be noted that in the present embodiment, the control to reduce the fuel flow rate by the control device 30 as described in the first embodiment may also be used or does not need to be used. The use of the control to reduce the fuel flow rate can further enhance the effect of suppressing an increase in the compressor RPM (N).

As described above, the electricity generation system 200 according to the present embodiment is configured to control the operational status of the electric generator 20 on the basis of a change of the electric generator current (I), i.e., the shaft torque of the electric generator 20, which is equal to or larger than a predetermined value. Accordingly, suitable operational status control according to a change in the shaft torque of the electric generator 20 can be achieved. In particular, the occurrence of a fault in the engine due to a sharp decrease in the shaft torque of the electric generator 20 can be inhibited.

Third Embodiment

Figure 10:
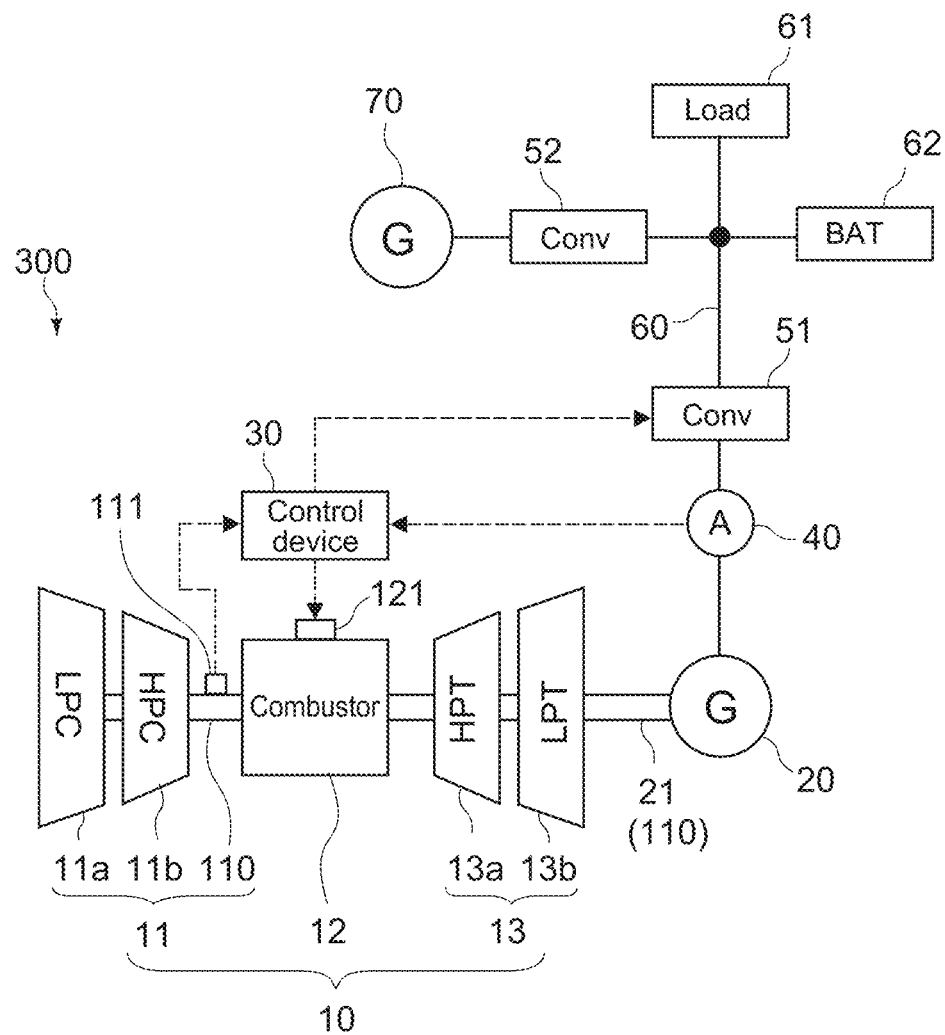
FIG. 10 A schematic configuration diagram of an electricity generation system according to a third embodiment of the present invention.

FIG. 10 is a schematic configuration diagram of an electricity generation system 300 according to a third embodiment of the present invention. Hereinafter, configurations different from those of the first embodiment will be mainly described, and configurations similar to those of the first and second embodiments will be denoted by similar reference signs and descriptions thereof will be omitted or simplified.

The electricity generation system 300 according to the present embodiment is an engine with an electric generator mounted on an aircraft and includes an engine 10, an electric generator 20, a control device 30, and an ammeter 40 as in the first embodiment, but it is configured to be capable of supplying electric power generated by an auxiliary electric generator 70 to the electric generator 20 in the present embodiment, which is a difference from the first embodiment.

In the present embodiment, the control device 30 is configured to generate a control signal for controlling the converter 51 to be capable of supplying the electric power of the auxiliary power supply 70 supplied to the power line 60 to the electric generator 20 in a case where a sharp decrease in the electric generator current is detected on the basis of the output of the ammeter 40. Also with such a configuration, electromagnetic braking torque can act on the rotor of the electric generator 20, using current from the auxiliary electric generator 70 that has been input to the electromagnetic coils 20U to 20W in the respective phases in the electric generator 20. Therefore, a sharp decrease in the shaft torque of the electric generator 20 and a sharp increase in the compressor RPM can be suppressed by an action similar to that shown in FIG. 9.

In the present embodiment, the converter 51 functions as an inverter converts DC power supply of the power line 60 into an AC signal so that braking torque can be obtained for the electric generator 20 on the basis of a control signal from the control device 30. The power supply source that supplies electric power for generating braking torque to the electric generator 20 is not limited to the above-mentioned auxiliary electric generator 70. For example, the battery 62 for storing DC electric power may be employed. It should be noted that various energy storage elements including a fly wheel may be employed as the battery 62.

As described above, the electricity generation system 300 according to the present embodiment is configured to control the operational status of the electric generator 20 on the basis of a change in the electric generator current (I), i.e., the shaft torque of the electric generator 20, which is equal to or larger than a predetermined value, as in the second embodiment. Accordingly, suitable operational status control according to a change in the shaft torque of the electric generator 20 can be achieved. In particular, the occurrence of a fault in the engine due to a sharp decrease in the shaft torque of the electric generator 20 can be inhibited.

It should be noted that also in the present embodiment, the control to reduce the fuel flow rate by the control device 30 as described in the first embodiment may also be used or does not need to be used. The use of the control to reduce the fuel flow rate can further enhance the effect of suppressing an increase in the compressor RPM (N).

Modified Examples

For example, in the above-mentioned embodiments, the prevention of a sharp increase in the compressor RPM due to a sharp decrease in the electric generator current or the shaft torque of the electric generator that is generated when cutting off current due to a fault in the load 61 connected to the power line at the subsequent stage of the electric generator 20 has been described, though not limited thereto. For example, in accordance with the present invention, a sharp increase in the RPM of the compressor due to a sharp decrease in the electric generator current or the shaft torque of the electric generator caused due to an open circuit fault in the electromagnetic coils of the electric generator 20 can also be inhibited.

Moreover, although in each of the above-mentioned embodiments, the case where the subject that detects a sharp decrease in the electric generator current or the shaft torque of the electric generator on the basis of the output of the ammeter 40 is the control device 30 has been described as an example, the converter 51 may detect a sharp decrease in the electric generator current or the shaft torque of the electric generator on the basis of the output of the ammeter 40. In this case, it is sufficient that the control device 30 makes a control to reduce the fuel flow rate, switching control in the short-circuit 22, or the like in accordance with a detection result from the converter 51.

In addition, the electricity generation system according to the present invention can be applied to a generally-used electric generator connected to an aircraft engine shaft (light aircraft, airliner, unmanned aerial vehicle, or the like).

It should be noted that in the above-mentioned embodiments, the electric generator 20 connected to the aircraft engine shaft has been described, though not limited thereto. It can be applied to a generally-used electric generator connected to a watercraft engine shaft or the like.

REFERENCE SIGNS LIST 10 engine
11 compressor
12 combustor
13 turbine
20 electric generator
21 drive shaft
30 control device
40 ammeter
51, 52 converter
61 load
62 battery
70 auxiliary electric generator
80 short-circuit
81 switching element
82 short-circuit line
100, 200, 300 electricity generation system
111 RPM sensor
121 fuel injector

The invention claimed is:

1. An electricity generation system, comprising:
an engine having a compressor including a rotating shaft;
an electric generator that is connected to the rotating shaft and generates electricity with rotational force of the rotating shaft;
a detector that detects shaft torque of the electric generator;
a short-circuit that short-circuits between terminals of a polyphase electromagnetic coil in the electric generator; and
a control unit configured to control an operational status of the engine or the electric generator on a basis of the shaft torque,
wherein the control unit is configured to control the short-circuit to short-circuit between terminals of the electromagnetic coil in respective phases in a case where the control unit determines that a decrease in the shaft torque is equal to or larger than a predetermined value thereby controlling the electric generator to generate electromagnetic braking torque.

2. The electricity generation system according to claim 1, wherein the control unit is configured to control the operational status in a case where the control unit determines that a change in the shaft torque is equal to or larger than a predetermined value.

3. The electricity generation system according to claim 2, wherein the control unit is configured to control power of the engine in a case where the control unit determines that a change in the shaft torque is equal to or larger than a predetermined value.

4. The electricity generation system according to claim 3, wherein the engine further includes:
a combustor that combusts an air-fuel mixture compressed by the compressor; and
a turbine that is connected to the rotating shaft and rotates combustion gas discharged from the combustor, and
wherein the control unit is configured to reduce an amount of fuel injected into the combustor in a case where the control unit determines that a decrease in the shaft torque is equal to or larger than a predetermined value.

5. The electricity generation system according to claim 1, wherein the detector includes an ammeter that detects current of electric power generated by the electric generator.

6. An aircraft comprising the electricity generation system according to claim 1.

7. An electricity generation system, comprising:
an engine having a compressor including a rotating shaft;
an electric generator that is connected to the rotating shaft and generates electricity with rotational force of the rotating shaft;
a detector configured to detect shaft torque of the electric generator;
a power supply source connected to the electric generator; and
a control unit configured to control an operational status of the engine or the electric generator on a basis of the shaft torque,
wherein the control unit is configured to supply electric power from the power supply source to the electric generator in a case where the control unit determines that a decrease in the shaft torque is equal to or larger than a predetermined value.

8. The electricity generation system according to claim 7, wherein the control unit is configured to control the operational status in a case where the control unit determines that a change in the shaft torque is equal to or larger than a predetermined value.

9. The electricity generation system according to claim 8, wherein the control unit is configured to control power of the engine in a case where the control unit determines that a change in the shaft torque is equal to or larger than a predetermined value.

10. The electricity generation system according to claim 9, wherein the engine further includes:
a combustor configured to combust an air-fuel mixture compressed by the compressor; and
a turbine that is connected to the rotating shaft and rotates combustion gas discharged from the combustor, and
wherein the control unit is configured to reduce an amount of fuel injected into the combustor in a case where the control unit determines that a decrease in the shaft torque is equal to or larger than a predetermined value.

11. The electricity generation system according to claim 7, wherein the detector includes an ammeter that detects current of electric power generated by the electric generator.

12. An aircraft comprising the electricity generation system according to claim 7.

* * * * *